United States Patent [19]
Johnson et al.

[11] Patent Number: 4,866,277
[45] Date of Patent: Sep. 12, 1989

[54] CONVEYOR APPARATUS FOR DETECTING RADIOACTIVE MATERIAL IN GARMENTS

[75] Inventors: Alfred N. Johnson, Voorhees; Martin D. Humphrey, Vincentown, both of N.J.

[73] Assignee: Westinghouse Electric Corp., Pittsburgh, Pa.

[21] Appl. No.: 201,807

[22] Filed: Jun. 2, 1988

[51] Int. Cl.$^4$ ............................................. G01T 1/167
[52] U.S. Cl. ............................. 250/385.1; 250/336.1
[58] Field of Search ................... 250/385.1, 336.1, 394

[56] References Cited

U.S. PATENT DOCUMENTS 3,418,474 12/1968 Spergel et al. ................... 250/385.1
4,253,025  2/1981 Fergus ............................. 250/385.1

FOREIGN PATENT DOCUMENTS 61-161481  7/1986 Japan ............................... 250/336.1

Primary Examiner—Constantine Hannaher
Attorney, Agent, or Firm—Walter S. Stevens

[57] ABSTRACT

An apparatus for detecting localized concentrations of radioactive particles in garments is disclosed. The apparatus generally comprises a conveyor assembly for receiving, moving and discharging garments which have been processed through a decontaminating wash, and a radiation detector assembly including a gas-flow proportional detector covered by a shielding wall of lead on all faces except for the face opposite the garments being inspected. The radiation detector assembly further includes a height adjustment mechanism for simultaneously supporting both the radiation detector and the shield wall so that the shield wall continues to present the same shielding geometry around the detector regardless of which height the detector is positioned over the conveyor assembly, obviating the need for adjusting the subtraction of background gamma radiation everytime the height of the detector is changed. To render detector capable of determining which specific portion of a particular garment contains one or more radioactive particles, a multi-zone type gas-flow proportional detector is used having a single conductive casing which forms a cathode, and a plurality of fork-shaped anode wires contained therein. Additionally, the housing of the radiation detector assembly supports a hold-down roller for firmly holding garments down on the conveyor assembly as they are moved from the infeed to the outfeed side of the assembly, thereby allowing a conveyor belt of minimal dimensions to be used.

26 Claims, 10 Drawing Sheets

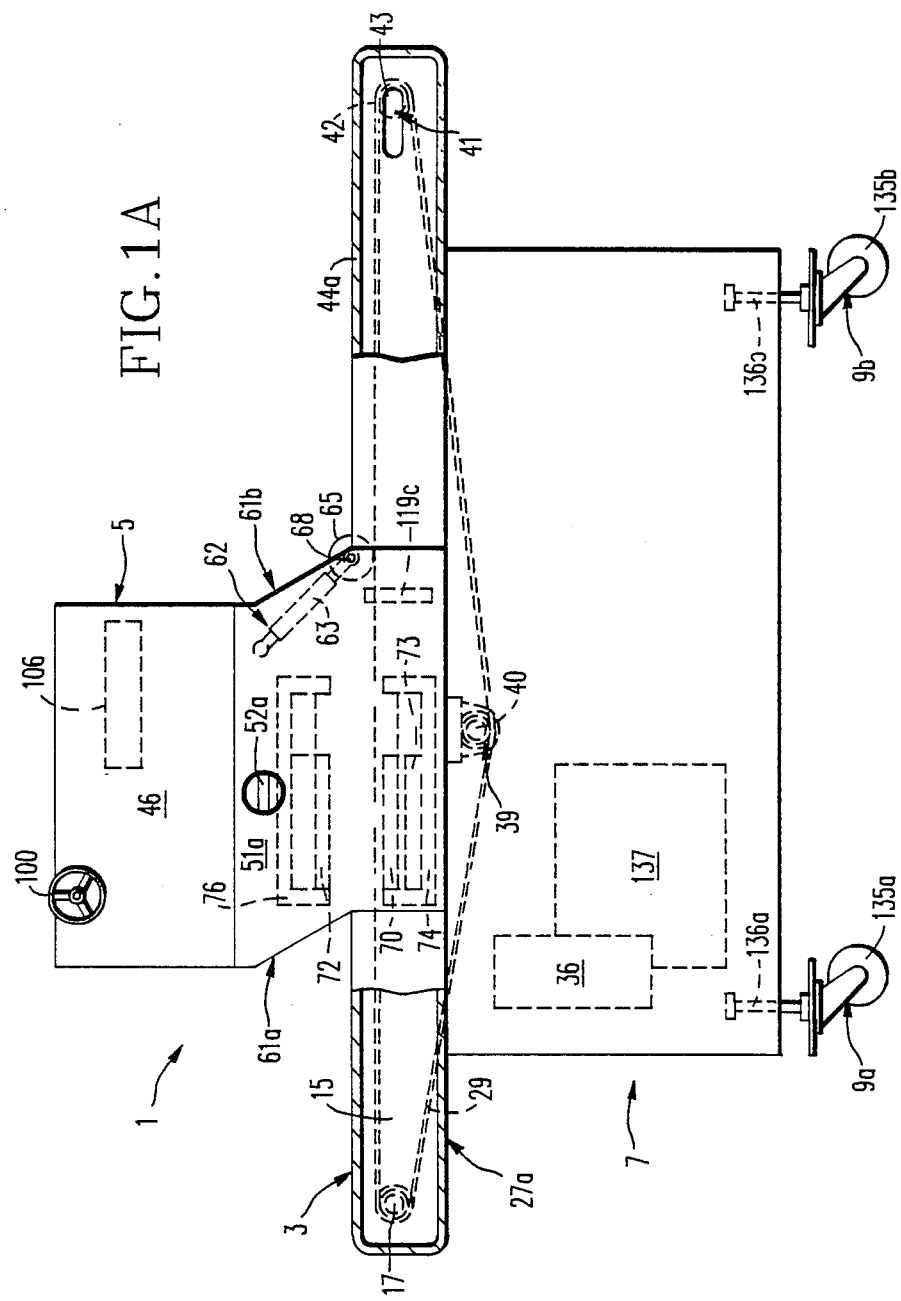

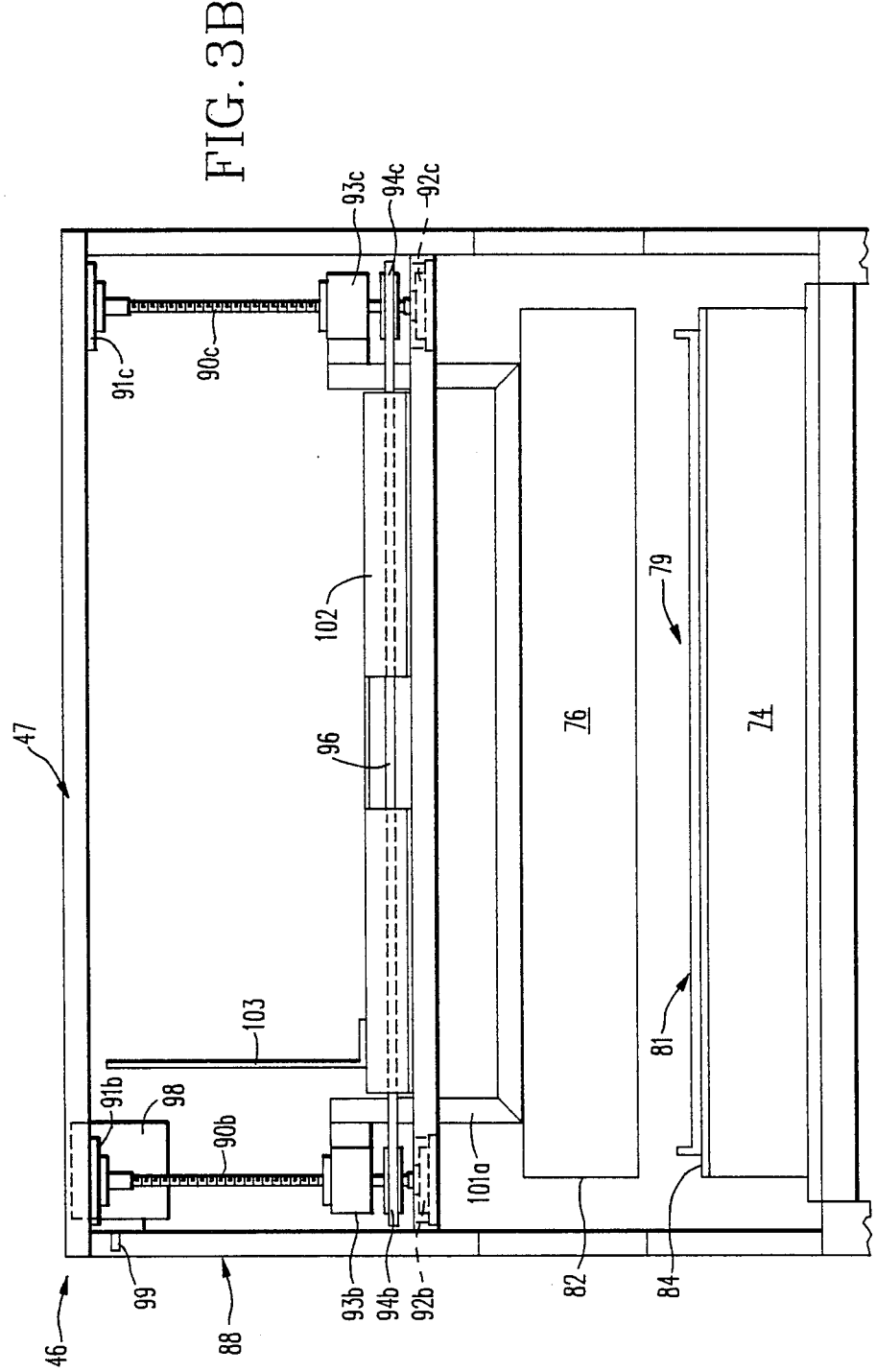

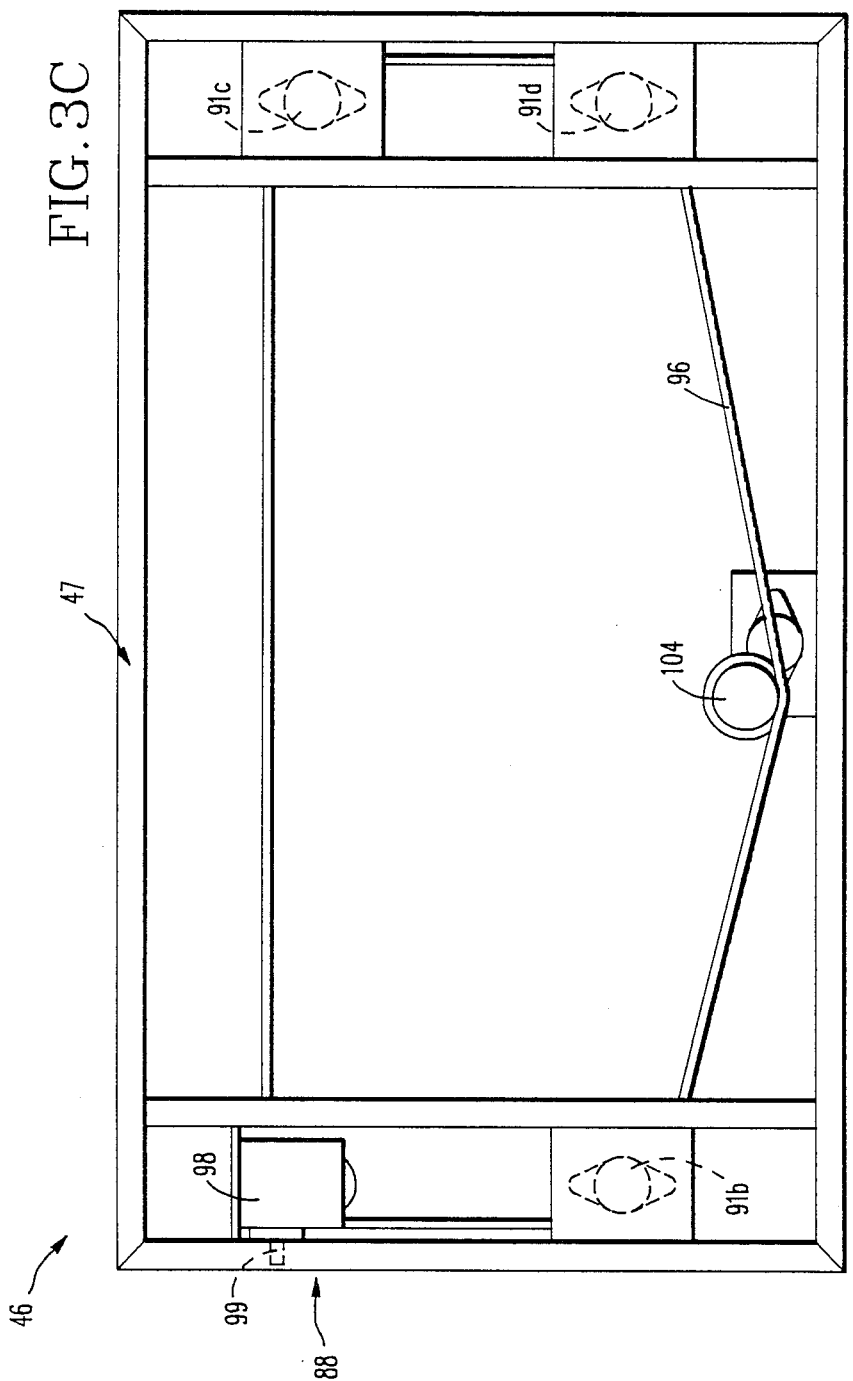

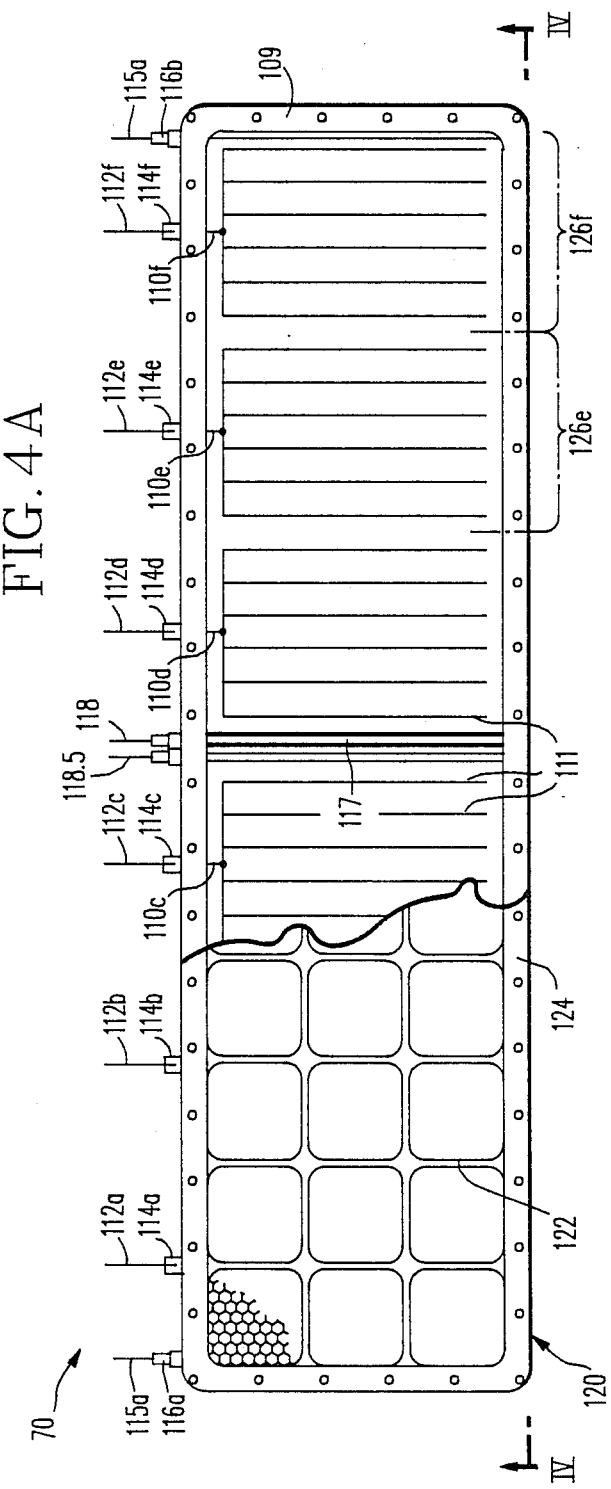

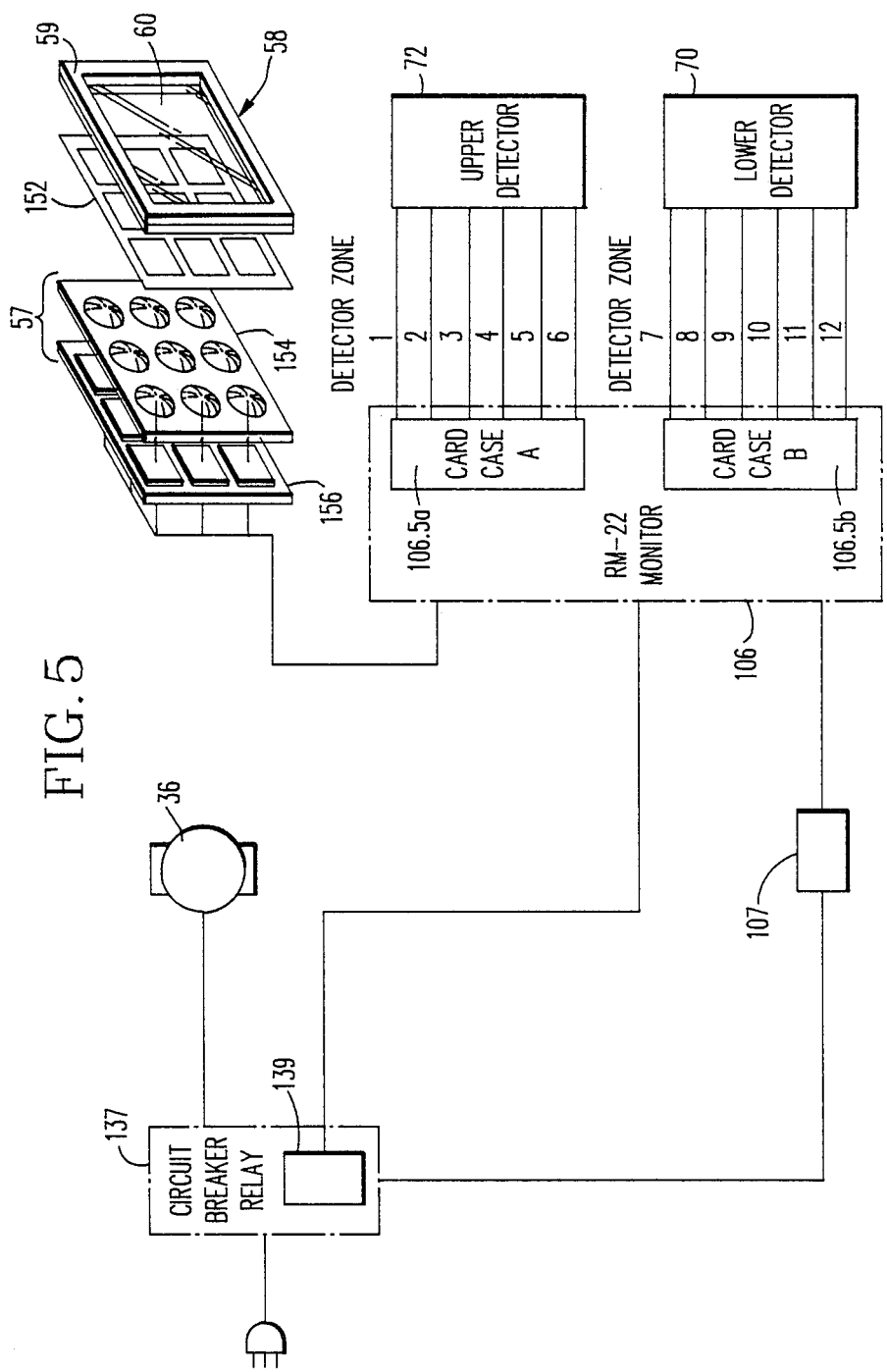

CONVEYOR APPARATUS FOR DETECTING RADIOACTIVE MATERIAL IN GARMENTS

BACKGROUND OF THE INVENTION

This invention generally relates to radiation detecting devices, and is specifically concerned with a portable conveyor apparatus for detecting localized concentrations of radioactive materials in the protective garments used in nuclear power facilities.

Conveyor-type devices for detecting radiation in such protective garments are known in the prior art. Generally, these devices comprise a horizontally disposed conveyor belt, and a radiation detector mounted adjacent to the belt for determining whether or not any of the garments fed through the conveyor radiate unacceptably high levels of radioactivity. Some of these prior art devices also include a movable support structure, such as a table on casters, for supporting the conveyor belt and radiation detector and rendering it portable. Such devices are often used to determine whether or not a particular garment that has been worn by a maintenance worker in a nuclear facility still contains radioactive material after being subjected to a decontamination cleaning. In operation, garments that have been subjected to such a decontamination cleaning process are fed through the conveyor belt while being monitored by the radiation detector mounted adjacent to the belt. If the level of the radioactivity of the garment exceeds a selected level, the detector triggers an alarm circuit which notifies the system operator to remove the contaminated article of clothing for further decontamination processing or disposal.

While there are conveyor-type radiation detectors in the prior art which are generally capable of determining whether or not a particular garment is still contaminated with an unacceptably high amount of radioactive material, the applicants have noted a number of shortcomings in these prior art devices. One such shortcoming is the manner in which these devices solve the problem of preventing the radiation alarm circuits from being spuriously actuated by background gamma radiation. This is a serious problem, as these conveyor-type radiation detectors are often operated in the laundry room of a nuclear facility where highly contaminated protective garments and assorted decontamination equipment (i.e., washers, filters, dryers) radiate significant amounts of gamma radiation. To prevent the spurious triggering of the radiation alarm circuitry in these laundry rooms, some of these devices exclusively rely upon a microprocessor which has been programmed to periodically sample the background gamma radiation when no garments are disposed adjacent to the detector, and to subtract the sampled background radiation value from the readings obtained by the radiation detector when garments are passed thereunder. While such exclusive reliance upon "background subtraction" obviates the need for providing thick and heavy lead shielding around the radiation detector to block out such background gamma radiation, it can also cause the device to give inaccurate or false readings since the background gamma radiation in a nuclear facility fluctuates considerably due to the movement of contaminated equipment in or around the vicinity of the device.

To solve the problems associated with exclusive reliance upon "background subtraction," other prior art designs provide thick lead shields around the radiation detectors. While such shields rarely succeed in blocking out all of the background gamma radiation, they at least reduce sole reliance upon "background subtraction." However, in order to obtain accurate readings from the radiation detector of a conveyor-type detection device, the distance between the detector and the garments must be reasonably constant. While many such garments lie substantially flat against the conveyor belt, some garments, such as the "duck feet" worn over the shoes of maintenance personnel project upwardly from the conveyor belt. Some prior art designs provide a means for adjusting the height of the detector so that the distance between the detector and the clothes passed through the conveyor belt can stay substantially the same. However, the applicants have noted that changes in the relative position of the radiation detector and the shielding wall changes the shielding geometry of the detector enough to require an immediate adjustment in the background subtraction if the readings taken by such radiation detectors are to remain accurate. This problem could be minimized by increasing the size of the shield walls. However, the relatively large amount of shielding material needed to substantially surround the radiation detector throughout the amplitude of its movement would add substantial weight to the device as a whole, thereby impairing the portability of the device.

Another problem associated with many of the prior art conveyor-type radiation detector devices results from the fact that the radiation detectors used are often of a single-zone type, thereby making it difficult if not impossible to determine whether radiation emitted by the garment is the result of a single, localized "hot particle," or is the result of a contaminant that is uniformly spread around the garment. This is a serious deficiency, as the applicants have noted that the type of contamination which most commonly necessitates the reprocessing of a particular garment is almost never uniformly disposed throughout the area of the garment, but instead is localized in small (less than 100 cm$^2$) "hot spots" or as a single, microscopic "hot particle" whose field of radiation, although small, is intense. Such particles present a real contamination control problem since they are small enough to migrate completely through the fabric forming the protective garment and to lodge themselves in intimate contact with the skin of the worker, where their small but intense field of radiation could have adverse affects on the skin. To resolve whether the radiation detected from a particular garment is located in a single spot or spread out over the area of the garment, some conveyor-type detection devices use a bank of multiple scintillation detectors. However, this type of multiple detector arrangement may have blind spots in areas between detectors which could allow a hot particle to escape detection.

A final shortcoming of many prior art conveyor-type detector devices is the fragility of the detectors that they employ. In many of these devices, thin plastic (Mylar ®) windows are used to cover the radiation-sensitive cells whether they be of the scintillation type (gamma sensitive) or gas-flow proportional (beta sensitive) type. While such covers effectively isolate the detector sensors from the ambient atmosphere and perform the important function of preventing lint and debris from accumulating in the sensor cells, they are delicate and subject to breakage. Such breakage necessitates replacement. In scintillation-type detectors, such replacement is expensive. In gas-flow proportional type detectors, such replacement causes four hours or more of downtime if the replacement detector must be completely purged. Some manufacturers have attempted to solve this problem by providing thicker, stronger windows. However, such thick windows seriously attenuate the sensitivity of the detector cells to beta radiation, which in turn seriously comprises the overall sensitivity of the detector.

Clearly, what is needed is a conveyor-type radiation detector apparatus which is capable of accurately and reliably detecting the presence of excessive radioactive contamination on protective garments that have undergone decontamination, but yet which is small and lightweight enough to be easily handled by a single person in a nuclear facility. Ideally, the radiation detector used in such an apparatus should have a plurality of radiation sensitive zones so that the existance of one or more "hot particles" in a particular garment may be at least generally ascertained. The radiation sensitive zones of the detector should be free of blind spots between detector cells so that no localized areas of radioactive contamination go undetected. Finally, the components of such an apparatus should be resistant to breakage, reasonable in cost and capable of continuous operation with a minimum of downtime.

SUMMARY OF THE INVENTION

Generally speaking, the invention is an improved conveyor-type radiation detector apparatus which overcomes the shortcomings associated with the prior art. The apparatus of the invention comprises a conveyor assembly for receiving, moving and discharging garments, and a radiation detector assembly including a radiation detector, a lead shield for shielding from ambient radiation, and a height adjustment mechanism for mounting the radiation detector and the shield over the conveyor assembly and for adjusting the distance between the detector and the garments moved by the conveyor assembly while maintaining the shield in the same shielding orientation relative to the detector. In the preferred embodiment, the sheild is a shallow lead box which covers every face of the radiation detector except for the face oriented toward the garments being inspected. Such a shield not only effectively blocks out ambient background gamma radiation regardless of the specific orientation between the detector of the garments, but further enhances the sensitivity of the detector means to gamma radiation by providing a surface that reflects at least some of the gamma rays back toward the detector due to "backscattering," thereby giving the detector two opportunities to detect the same gamma ray. Moreover, the use of a shield that moves along with the detector in the same shielding orientation obviates the need for adjustments to background subtraction whenever the height of the detector is changed as garments of different thicknesses are conveyed through the detector assembly.

The radiation detector preferably includes a plurality of detecting zones, each of which is independently sensitive to radioactivity in order to indicate which portions of a particular garment are contaminated with radioactive particles. To this end, the detector may be a gas-flow proportional detector having a single conductive casing for forming one electrode of one charge, and a plurality of parallel, fork-shaped electrode wires for forming multiple electrodes of an opposite charge. Such a structure advantageously provides a detector having multi-zone sensitivity without "dead spaces" between adjacent zones. Such a structure also decreases the sensitivity of the detector to background gamma radiation as a whole, which results in an improved signal to noise ratio.

The apparatus may further include a hold-down roller assembly for maintaining garments on the conveyor assembly as the conveyor assembly receives, moves and discharges the garments. The provision of such a roller assembly advantageously minimizes the dimensions of the conveyor belt used in the conveyor assembly, thereby helping to render the entire apparatus small enough to be handled by a single operator and stored in a space of limited area. The apparatus further includes a support structure in the form of a cabinet having casters on its feet to render the apparatus easily movable. Both the infeed and outfeed end of the conveyor assembly preferably overhangs the cabinet forming the support structure in order to provide recesses for garment baskets. Additionally, each of the casters on the feet of the cabinet is height adjustable so that the apparatus may be rendered level on an uneven floor or adjusted to fit recovery baskets of differing heights.

The radiation detector assembly preferably includes not only an upper detector disposed over the conveyor assembly, but a lower detector disposed under the conveyor assembly to maximize the sensitivity of the apparatus to beta radiation emitted from the garments being inspected. The radiation detector assembly may further include protective screens for both the upper and the lower radiation detector means which are detachably removable and include a stainless steel protective grid that is approximately 70 percent open. The lower detector is further protected by plastic sheet material which is thin enough to be transparent to beta radiation, yet thick enough to protect the interior of the detectors from lint and other debris falling through the conveyor belt. In the preferred embodiment, the protective screens includes a sheet of Mylar ® approximately 0.25 mils thick.

Finally, in order to minimize the down time associated with the use of the apparatus, the radiation detector assembly may include a spare radiation detector for replacing either the upper or the lower radiation detector in the event of a malfunction. The spare detector is preferably a gas-flow proportional detector that is fluidly connected to the same source of counting gas that the upper and lower detectors are connected to so as to minimize the purge time necessary to bring the spare detector into working order.

BRIEF DESCRIPTION OF THE SEVERAL FIGURES

FIG. 1A is a side view of the conveyor-type radiation detection apparatus of the invention shown partially in cross-section to expose the drive roller mechanism;

FIGS. 3A, 3B and 3C are side, front and top views of the height adjustment mechanism disposed within the housing of the radiation detector assembly;

FIG. 4A is a plan view of one of the gas-flow proportional detectors used in the radiation detector assembly with part of the protective screen which normally covers its top surface broken away;

FIG. 4B is a cross-sectional side view of the radiation detector illustrated in FIG. 4A, and FIG. 5 is both a generalized schematic diagram of the electronic circuitry of the apparatus and an exploded perspective view of the dust and contaminative cover that is mounted over the push button controls of the control panel.

DETAILED DESCRIPTION OF THE PREFERRED EMBODIMENT

Figure 1B:
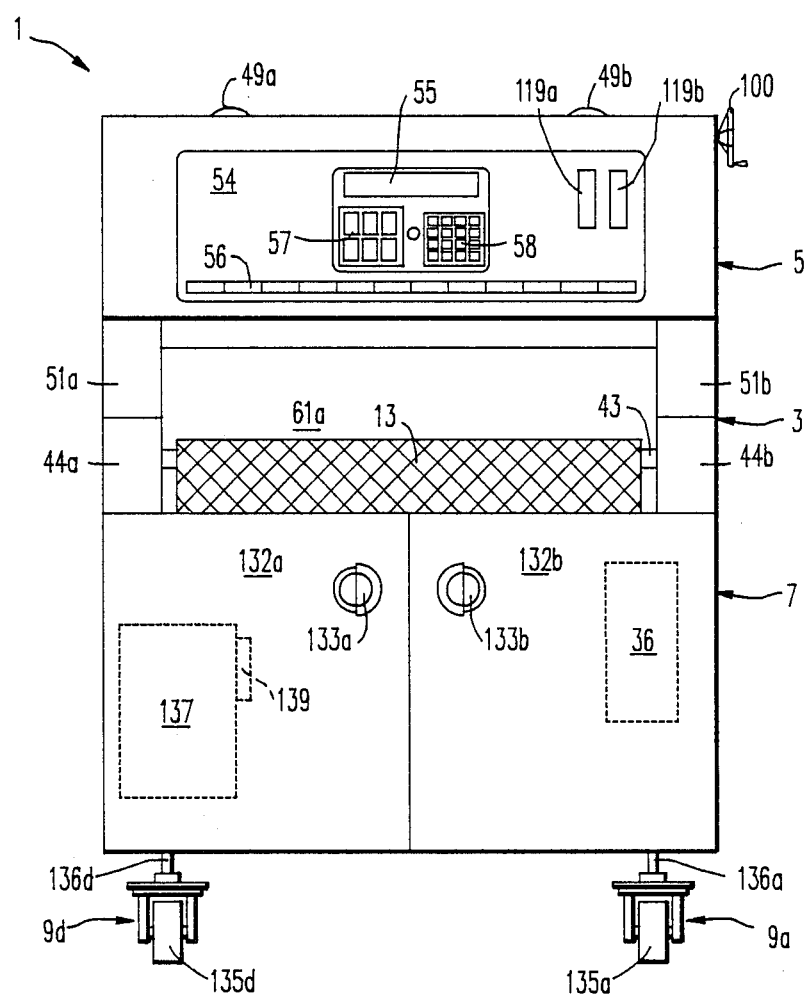
FIG. 1B is a front view of the apparatus illustrated in FIG. 1A showing the infeed of the conveyor assembly, the control panel and the front cabinet that supports both the conveyor assembly and the radiation detector assembly.
Figure 1C:
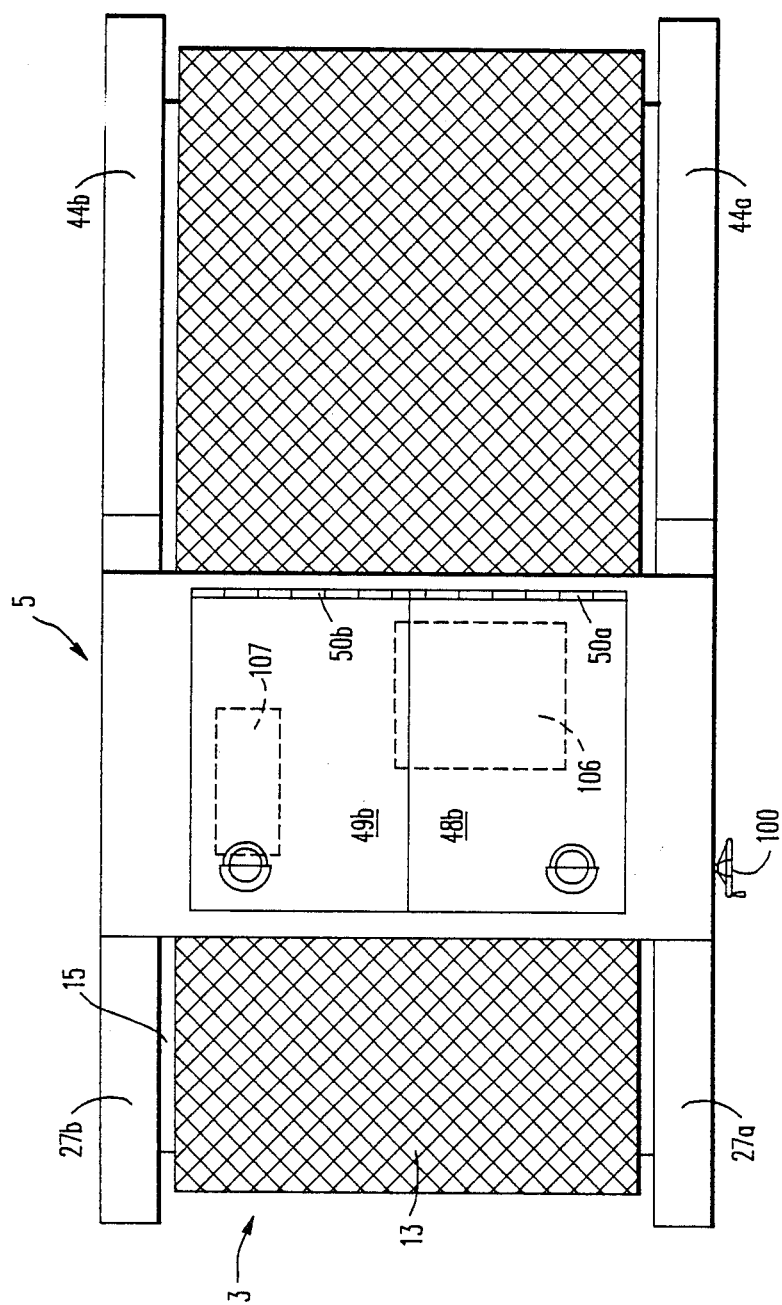
FIG. 1C is a plan view of the radiation detection apparatus illustrated in FIG. 1B.

With reference now to FIGS. 1A, 1B and 1C, the conveyor-type radiation detection apparatus 1 of the invention generally comprises a conveyor assembly 3 for receiving, moving and discharging a garment to be tested, a radiation detector assembly 5 that includes radiation detectors disposed both above and below the conveyor assembly 3 for simultaneously measuring the radioactivity of both sides of the garments moved therethrough, and a support cabinet 7 that supports the conveyor assembly 3 at an ergonometrically optimal level. The bottom of the support cabinet 7 includes four height-adjustable casters 9a-9d so that the entire apparatus 1 may be rolled into a desired location by a single operator and easily leveled.

With reference now to FIGS. 1A, 1B and 1C, the conveyor assembly 3 includes a conveyor belt 13 preferably fabricated from an open, stainless steel mesh, a conveyor table 15 for supporting the conveyor belt 13, and a drive roller mechanism 17 (best seen in FIG. 2A) for driving the conveyor belt 13 at a selected speed. In the preferred embodiment, the open spaces between the wire mesh forming the conveyor belt 13 takes up approximately 60 percent of the belt area as a whole, thereby rendering the belt substantially transparent to any beta radiation emitted by radioactive matter in the garments being tested. The conveyor table 15 is lined with high molecular weight polyethylene for providing a low-friction, sliding surface for the conveyor belt 13. Both the mesh forming the belt 13 and the sheet metal forming the conveyor table 15 are made from noncorrodible stainless steel to facilitate decontamination of the apparatus 1.

Figure 2A:
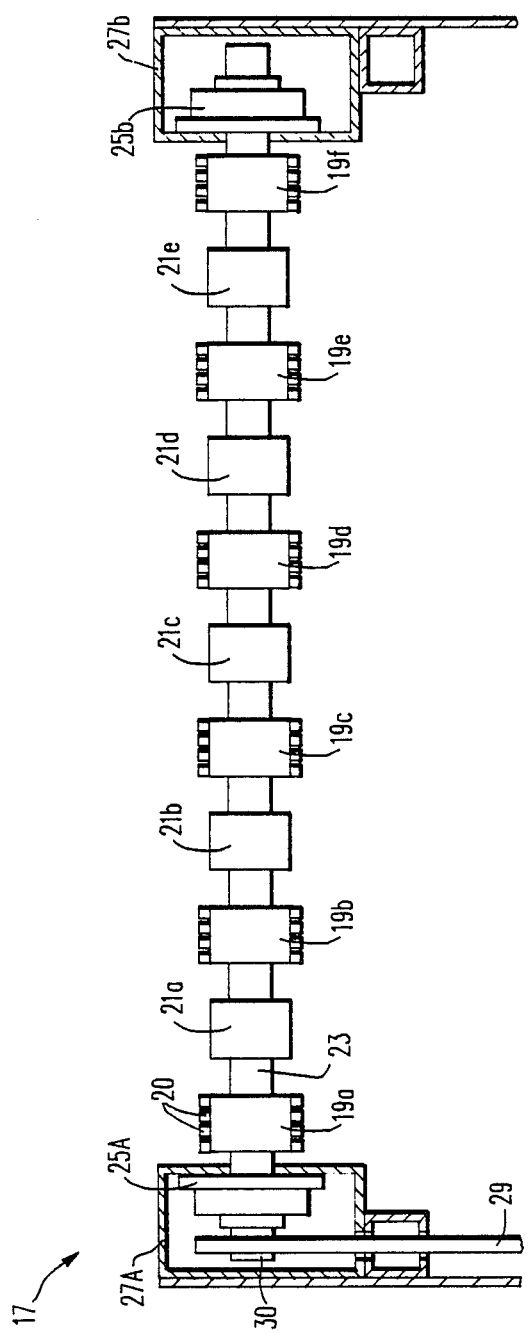
FIG. 2A is a side view of the drive roller mechanism of the conveyor assembly.
Figure 2B:
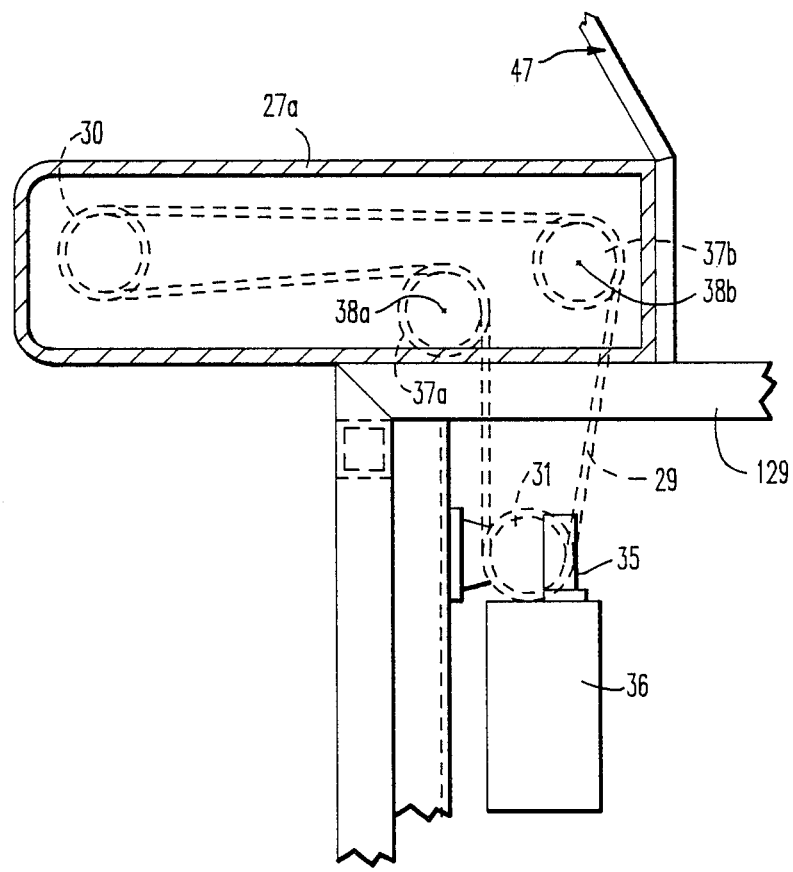
FIG. 2B is a side view of the drive train that powers the driver roller mechanism illustrated in FIG. 2A.

As shown in FIG. 2A, the drive roller mechanism 17 includes six mesh drive sprockets 19a-19f, each of which has a plurality of drive teeth 20 capable of registering within the open spaces of the mesh forming the belt 13, as well as five support rollers 21a-21e interspersed between the mesh drive sprockets 19a-19f as shown. Both the mesh drive sprockets 19a-19f and the support rollers 21a-21e are connected to and uniformly spaced along the drive shaft 23. In the preferred embodiment, both the sprockets 19a-19f and rollers 21a-21e are formed from a high molecular weight (HMW) polyethylene plastic. The ends of the driven shaft 23 are journaled within roller bearings 25a, 25b that in turn are mounted in opposing support housings 27a, 27b disposed along the sides of the conveyor table 15. As shown in FIG. 2B, the shaft 23 is driven by a drive chain 29 which meshes with a sprocket 30 affixed to one of its ends. The chain 29 is in turn driven by a drive sprocket 31 that meshes with a worm shaft 35 of an electric motor 36. Tensioning sprockets 37a, 37b also mesh with the drive chain 29. These tensioning sprockets 37a, 37b are journaled on to stub shafts 38a, 38b which are slidably mounted within the housing 27a to control the amount of tension that the drive chain 29 operates under.

With reference again to FIG. 1A, a belt diverter tensioner 39 is mounted beneath the conveyor table 15 within the support cabinet 7 as shown. This belt diverter tensioner includes a shaft 40 over which the conveyor belt 13 rollingly engages. The belt diverter tensioner 39 not only affords some degree of adjustability to the tension that the belt 13 operates under as the sprocket 39 is movable; it also serves to space the conveyor belt 13 away from the radiation detector assembly 5 to avoid mechanical interference therebetween. Disposed across from the drive roller mechanism 17 on the opposite end of the conveyor table 15 is an idler roller mechanism 41. This mechanism 41 is formed from a plurality of sprockets 42 (of which only one is shown) that are uniformly disposed across a shaft 43 in much the same way that the mesh drive sprockets 19a-19f are disposed across the shaft 23. Although not specifically shown in FIG. 1A, the ends of the idler shaft 43 are journaled within bearings that are mounted within the support housings 44a, 44b disposed across the sides of the conveyor table 15.

The radiation detector assembly 5 includes a rectangular housing 46 formed from smooth sheets of easily decontaminable stainless steel affixed along their edges to a tubular frame 47. At the top of the detector assembly 5, a pair of cabinet-style doors 48a, 48b are provided to afford the system operator access to the radiation detector circuitry 106 and constant-voltage transformer 107 contained within the upper portion of the housing 46. Each of these doors 48a, 48b has a handle 49a, 49b at one end, and a hinge 50a, 50b along its opposite end. As is best seen in FIG. 1B, the control panel 54 of the radiation detector circuitry 106 is mounted on the front side of the housing 46. The control panel 54 includes a liquid-crystal display 55 to provide a visual display of the output of the radiation detector circuitry 106 contained within the housing 46, as well as a row of alarm lights 56, and control buttons 57. A dust cover assembly 58 is advantageously provided over the control buttons 57. The dust cover assembly generally comprises a frame with a thin sheet of sheet material 60, which may be transparent Mylar®, mounted therein. Such thin, transparent sheet material easily conducts the pressure of the operator's finger to the control buttons 57 while effectively preventing radioactive dust and debris from being lodged around or within the control buttons 57, thereby rendering the control panel 54 easily decontaminable.

Disposed in the central portion of the housing 46 of the radiation detector assembly 5 are rectangular infeed and outfeed openings 61a, 61b. Disposed within the housing 46 across the mid-portion of the outfeed opening 61b is a hold-down roller assembly 62, which prevents the garments being scanned by the radiation detectors within the detector assembly 5 from falling off of the conveyor belt 13 during the scanning operation. This is a particularly useful function where elongated garments, such as trousers, are being scanned, since such garments will tend to rapidly slide off the conveyor belt 13 as soon as a substantial portion of the garment is discharged over the edge of the conveyor table 15. The hold-down roller assembly 62 is formed from a support arm 63 which is pivotally mounted at its upper end to the housing 46 and which includes a roller 65 at its other end journaled on a shaft 68. The weight of the hold-down roller assembly 26 biases the roller 65 against the conveyor table 15.

Figure 3A:
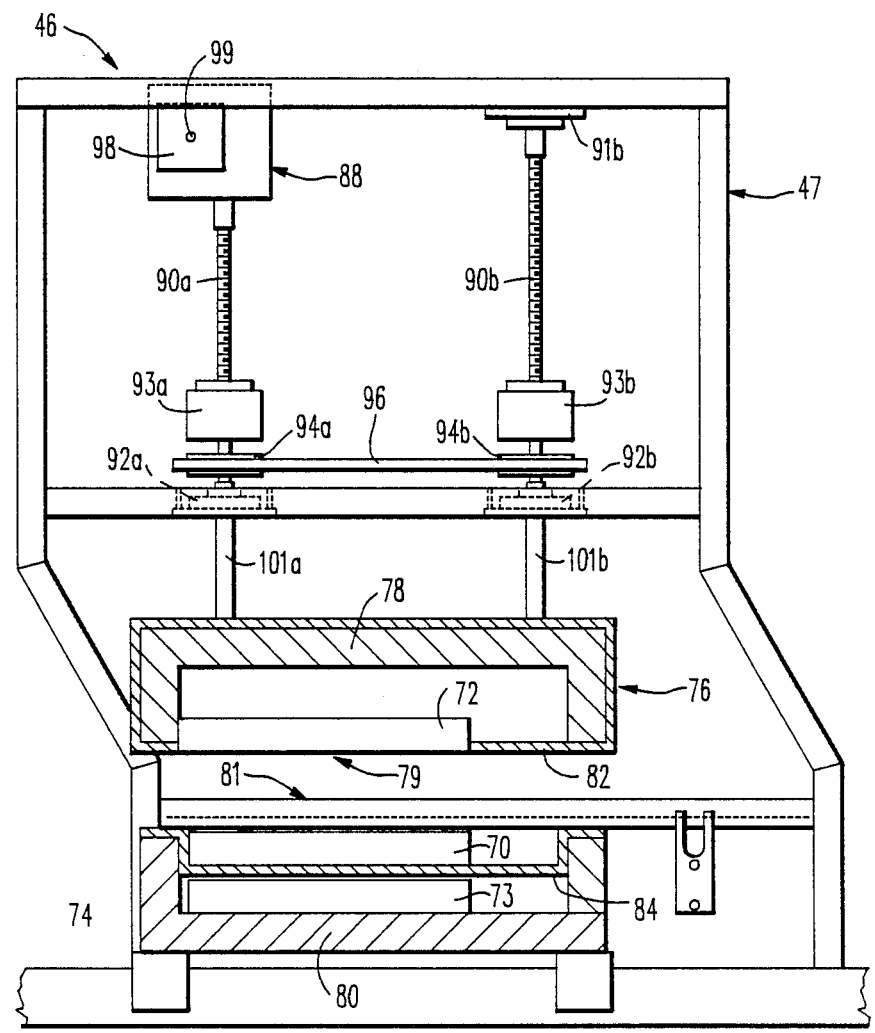

Centrally disposed at the bottom portion of the housing 46 of the radiation detector assembly 5 are both a lower radiation detector 70 and an upper radiation detector 72. The lower detector 70 is disposed just beneath the conveyor belt 13, while the upper detector 72 is disposed over the belt 13 in opposition to the lower detector 70. A spare radiation detector 73 is located just under the lower detector 70 (as is best seen in FIG. 3A). Both the lower and upper detector 70, 72 are completely surrounded on their sides and back by lower and upper gamma radiation shields 74, 76. Each of these shields 74, 76 includes a rectangular wall structure 78, 80 formed from lead approximately 1.00 inches thick. Each of these wall structures 78, 80 includes an open side 79, 81 for freely exposing the radiation-sensitive side of the lower and upper detector 70, 72. As is best seen in FIG. 3A, each of the wall structures 78, 80 of the shield 74, 76 is clad in sixteen gauge stainless steel sheet metal 82, 84. Such cladding helps to render the interior of the housing 46 more easily decontaminable, and helps protect the system operator from exposure to lead, which is toxic.

With reference now to FIGS. 3A, 3B and 3C, the interior of the housing 46 of the radiation detector assembly 5 includes a height adjustment mechanism 88 for simultaneously adjusting the height of the upper detector 72 and its respective radiation shield 76. This mechanism 88 is formed from four parallel threaded shafts 90a–90d disposed vertically in a rectangular pattern as shown. The upper and lower ends of the threaded shafts 90a–90d are journaled in upper shaft bearings 91a–91d and lower shaft bearings 92a–92d, respectively. Four ball nuts 93a–93d are threadedly engaged to the shafts 90a–90d and are capable of moving along the longitudinal axis of their respective shafts in "riding nut" fashion when these shafts are rotated. Drive sprockets 94a–94d fixedly circumscribe the lower ends of the threaded shafts 90a–90d. A single chain driver 96 simultaneously meshes with all four of the driven sprockets 94a–94d. The chain driver 96 in turn meshes with an output drive sprocket 97 of a 90 degree converter-reducer gear assembly 98. This converter-reducer gear assembly 98 also includes an input shaft 99 connected to a hand wheel 100. The converter-reducer gear assembly 98 advantageously affords approximately a five to one input-output gear reduction. Such a gear reduction allows the system operator to raise both the upper detector 72 and the heavy lead shield 76 that surrounds it with very little effort. As is best seen in FIGS. 3A and 3B, ball nuts 93a and 93d are connected to a shallow U-shaped bracket 101b, while ball nuts 93d and 93c are connected to a second shallow, U-shaped bracket 101a. The bottoms of each of the U-shaped brackets 101a, 101b are mounted onto the top portion of the radiation shield 76 of the upper detector 72. When the handwheel 100 of the of converter-reducer assembly 98 is turned, threaded rod 90a is rotated as the top end of this threaded rod is connected to the output of the converter-reducer gear assembly 98. The turning of the threaded rod 90a causes the sprocket 94a to turn also, which in turn drives the chain 96 to turn the other sprockets 94b–94c which fixedly circumscribe the threaded rods 90b–90d. Thus the ball nuts 90a–90d can be made to ascend or descend along the threaded rods 90a–90d in unison, thereby lifting or lowering the radiation shield 76 that contains the upper detector 72. A floor panel 102 straddles the U-shaped brackets 102a, 102b. A calibrated height indicator 103 is attached to the floor panel 102 for indicating to the operator how high the detector 76 is over the conveyor belt 13. In addition to supporting the height indicator 103, the floor panel also serves to support the previously mentioned radiation detector circuitry 106 and constant voltage transformer 107. Finally, a tension adjusting sprocket 104 is movably mounted within the housing 46 of the radiation detector assembly 5 so that the tension on the drive chain 96 may be adjusted.

With reference now to FIGS. 4A and 4B, the lower, upper and spare radiation detectors 70, 72 and 73 each include a shallow, rectangular housing 109 formed from a conductive metal such as aluminum which contains six fork-shaped electrodes 110a–110f. As will be described in more detail hereinafter, the conductive housing 109 forms a cathode, while each of the six forked-shaped electrodes 110a–110f forms a separate anode. The electrodes 110a–110f each preferably include six tines formed from stainless steel. Connector wires 112a–112f connect each of the electrodes 110a–110f to a source of high voltage. Gas fittings 114a–114f provide a gas-tight seal between the connector wires 112a–112f and the ports in the housing 109 through which they pass. Similarly, fittings 114a, 114b provide gas-tight seals between cathode connector wires 115a and 115b and the ports in the housing 109 through which these wires pass. A manifold 117 is centrally disposed across the middle of the housing 109 for distributing P-10 counting gas, which is a mixture of 90 percent argon and 10 percent methane. An air-tight gas fitting 118 connects the manifold 117 to the housing 109. A gas line 118.5 is fluidly connected at one end to the manifold 117 and to a source of P-10 gas (not shown) at its other end to provide a constant flow of pressurized P-10 gas through the housing 109. The amount of P-10 gas that flows through each of the manifolds of the detectors 70, 72 and 73 is measured and displayed by flowmeters 119a–119c. A protective screen 120 is mounted around the upper edge of each of the detectors 70, 72, 73 for both isolating the interior of the housing 109 from the ambient atmosphere, as well as for preventing the incursion of dust and lint from the outside into the interior of the housing 109. This protective screen 120 is formed from a grid 122, a perforated sheet 122.5 of stainless steel attached over the grid 122 and a sheet 123 of aluminized Mylar ® attached to the underside of this grid 122. The edges of the grid are in turn sealingly engaged between a frame 124 and the upper edge of the housing 109. In the preferred embodiment, each of the detectors 70, 72 and 73 is a Model 43-62 gas proportional probe manufactured by Ludlum Measurements, Inc. located in Sweetwater, Tex. It should be noted that the independently charged, fork-shaped electrodes 110a–110f, in combination with the oppositely charged aluminum housing 109, result in a gas proportional detector having a plurality of mutually overlapping radiation sensitive zones 126a–126f (of which only contiguous zones 126e and 126f are indicated). Each of these zones is independently sensitive to radiation, which advantageously reduces the sensitivity of the detectors 70, 72 and 73 to background gamma radiation as a whole, thereby increasing the signal to noise ratio. Additionally, such individual sensitivity allows the operator to locate the particular spot where the garment is contaminated.

With reference back to FIGS. 1A, 1B and 1C, the support cabinet 7 of the apparatus 1 is formed from a tubular frame 129 over which smooth, easily decontaminable stainless steel sheet metal walls 130 are mounted. As is best seen in FIG. 1B, the front side of the support cabinet 7, includes a pair of cabinet doors 132a, 132b having handles 133a, 133b at one side and hinges (not shown) on the other side. Each of the previously mentioned casters 9a–9d includes a rubber wheel 135a–135d to make it easy for the operator to roll the apparatus 1 over a hard surface. Additionally, each of the casters 9a–9d includes a threaded shaft 136a–136d which is received within a threaded sleeve not shown in the support cabinet 7. The height of each of the casters 9a–9d with respect to the support cabinet 7 may be varied by merely turning the caster clockwise or counterclockwise, thereby allowing the operator of the apparatus 1 both to render the conveyor assembly 3 level on an unlevel floor, and to adjust the height of the conveyor table 13 to accommodate laundry baskets of different sizes.

FIG. 5 generally illustrates the layout of the electronic components of the apparatus 1. These components include the previously mentioned radiation detector circuitry 106, which, in the preferred embodiment, is a Model RM-22 radiation monitor manufactured by Eberline, a subsidiary of Thermo Instrument Systems, Inc., located in Santa Fe, N. Mex. The connector wires 112a–112f of both the lower and upper detectors 70, 72 are each connected to a separate card cages, 106.5a, 106.5b as indicated by way of coaxial cables. Each of the card cages 106.5a and 106.5b includes an individual amplifier-discriminator board for each of the anodes, which are preferably a Model No. YP10722000 and YP11168000 manufactured by the previously mentioned Eberline. Additionally, each of these anodes is connected to an Eberline Model P-201BHV power supply, which supplies a potential of between 1600 and 1800 volts for each anode. Power is supplied to the radiation detector circuitry 106 by way of the previously mentioned constant voltage supply 107. In the preferred embodiment, constant voltage supply 107 is a Model Series 68007-03 micropower conditioner manufactured by Topaz a subsidiary of Square D Company located in San Diego, Calif. The constant voltage supply 107 is in turn connected to a source of alternating current by way of circuit breaker cabinet 137. It should be noted that the conveyor assembly motor 36 is also connected to a source of AC power through the circuit breaker cabinet 137. Mounted with the circuit breaker cabinet 137 is a conveyor motor adjuster 139 which is electrically connected between the input of the motor 36 and the source of alternating current. The previously mentioned control buttons 57 are connected to the input of the radiation detection circuitry as indicated. As has been mentioned previously, a dust cover assembly 58 comprising a frame and a thin sheet of Mylar ® overlies these control buttons 57 in order to prevent contaminated dust and other debris becoming lodged therein. A button indicator card 152 formed from a sheet of thin, resilient plastic overlies a blister switch card 154 that forms part of the control buttons 57. The purpose of the indicator card 152 is to inform the operator of each of the control buttons 57. Each of the blister switches on the blister switch card 154 is electrically connected to a solid state relay in a relay card 156. In the preferred embodiment, relay card 156 is an array of "smart latching" Model No. 52-C3-5V relays manufactured by Aromat located in New Providence, N.J. The use of such solid state relays in the button control assembly 57 advantageously provides a push button control having buttons whose state is easily changed by the application of a small amount of pressure from the finger of an operator. The small distance required to actuate the button switches and to change the state of the relays on the relay card 156 advantageously minimizes the stresses applied on to the thin plastic sheet of the dust cover assembly 58.

We claim:

1. An apparatus for detecting radioactive particles in garments, comprising:
   a. a conveyor assembly for receiving, moving and discharging garments; and
   b. a radiation detector assembly including first and second radiation detector means, each of which includes a face that is primarily sensitive to beta radiation throughout its entire area, a shield means for shielding said first detector means from ambient radiation, and a height adjustable mounting means for mounting said first radiation detector means and said shield means over said conveyor assembly and for adjusting the distance between the detector means and the top side of the garments moved by the conveyor assembly while maintaining the shield means in the same shielding orientation relative to said detector means, said second radiation detector means being disposed under said conveyor assembly so that said first radiation detector means detects beta radiation emitted substantially from the top side of said garments while said second radiation detector means detects beta radiation emitted substantially from the bottom side of said garments.

2. The apparatus defined in claim 1, wherein each of said first and second detector means is a gas flow proportional detector having a single conductive casing for forming one electrode of one charge, and at least one fork-shaped array of wires for forming multiple electrodes of an opposite charge that define a plurality of mutually-contiguous, beta sensitive zones, each of which is independently sensitive to radioactivity for indicating which portions of a particular side of a particular garment are contaminated with radioactive particles.

3. The apparatus defined in claim 1, further including a hold-down roller means for maintaining garments on the conveyor assembly as the conveyor assembly receives, moves and discharges the garments.

4. The apparatus defined in claim 1, further comprising a support means for supporting said conveyor assembly and said radiation detector assembly.

5. The apparatus defined in claim 4, wherein said support means includes a plurality of caster means to render the apparatus movable.

6. The apparatus defined in claim 5, wherein each of said caster means is height adjustable so that said conveyor assembly may be rendered level when said support means stands on an unlevel floor.

7. The apparatus defined in claim 1, wherein said radiation detector assembly further includes a protective screen means detachably mountable between said radiation detector means and the garments moved by said conveyor assembly.

8. The apparatus defined in claim 1, wherein said conveyor assembly includes a horizontally disposed belt having a width that is the minimum necessary to support the largest garment placed thereon in a flattened orientation.

9. The apparatus defined in claim 1, wherein said radiation detector assembly includes a control panel having a plurality of pressure-actuable switches, and a flexible dust cover disposed over the switches of said panel for preventing dust from accumulating in said switches and for transmitting the pressure applied by the finger of a system operator to said switches.

10. An apparatus for detecting radioactive particles in garments, comprising:
   a. a conveyor assembly for receiving, moving and discharging garments, and
   b. a radiation detector assembly including first and second radiation detector means, each of which includes a face that is primarily sensitive to beta radiation throughout its entire area a shield means for shielding said first detector means from ambient radiation, a height adjustable mounting means for supporting said first radiation detector means over said conveyor assembly and for adjusting the distance between the detector means and the top side of the garments moved by the conveyor assembly, said second radiation detector means being disposed under said conveyor assembly so that said first radiation detector means detects beta radiation emitted substantially from the top side of said garments while said second radiation detector means detects beta radiation emitted substantially from the bottom side of said garments
   wherein each of said detector means is a gas flow proportional detector having a single conductive casing for forming one electrode of one charge, and at least one fork-shaped array of wires for forming multiple electrodes of an opposite charge that define a plurality of mutually adjacent zones, each of which is independently sensitive primarily to beta radioactivity.

11. The apparatus defined in claim 10, wherein said adjustable mounting means also supports said shield means, and maintains the shield means in a shielding orientation relative to said first detector means when the distance between said conveyor assembly and said first radiation detector means is changed.

12. The apparatus defined in claim 10, further comprising a hold-down roller means for preventing garments longer than said conveyor assembly from falling off said conveyor assembly as they are moved across said assembly.

13. The apparatus defined in claim 10, further comprising a support means for supporting said conveyor assembly and said radiation detector assembly.

14. The apparatus defined in claim 13, wherein said conveyor assembly has an infeed end and an outfeed end, at least one of which overhangs the support means to provide a recess for a garment receptacle.

15. The apparatus defined in claim 10, wherein said radiation detector assembly includes a spare radiation detector means for replacing a radiation detector means in the event that one of said detector means malfunctions.

16. The apparatus defined in claim 10, wherein said conveyor assembly includes a conveyor belt formed from a material that is substantially conductive of beta radiation.

17. The apparatus defined in claim 16, wherein said conveyor material includes uniformly spaced openings for conducting beta radiation, and wherein the combined area of these openings forms over 50 percent of the area of the conveyor material.

18. An apparatus for detecting radioactive particles in garments, comprising:
   a. a conveyor assembly having an infeed side and an outfeed side for receiving, moving and discharging garments; and
   b. a radiation detector assembly including a radiation detector means that has a plurality of mutually adjacent detection zones, each of which is independently sensitive to both beta and gamma radiation, a shield means that circumscribes said detector means in a specific shielding orientation for both shielding the detector means from background radiation and for increasing the sensitivity of the detector means to gamma radiation, and a height adjustable mounting means for mounting said radiation detector means and said shield means over said conveyor assembly and for adjusting the distance between the detector means and the garment moved by the conveyor assembly, wherein the radiation detector assembly includes a spare gas-flow proportional detector so that said spare detector will be substantially ready for operation in the event of a malfunction of said original detector.

19. The apparatus defined in claim 18, wherein said detector means is a gas-flow proportional detector having a single conductive housing for forming one electrode of one charge, and a plurality of parallel electrode wires for forming multiple electrodes of an opposite charge.

20. The apparatus defined in claim 19, wherein said radiation detector assembly includes a source of pressurized counting gas fluidly connected to said gas-flow proportional detector for constantly replenishing the counting gas within the detector.

21. An apparatus for detecting radioactive particles in garments, comprising:
   a. a conveyor assembly for receiving, moving and discharging garments;
   b. a radiation detector assembly including an upper and a lower radiation detector means disposed above and below said conveyor assembly, respectively, wherein each detector means includes a plurality of mutually adjacent detecting zones which overlap one another, each of which is independently sensitive to radioactivity, an upper and a lower shield means that circumscribes the upper and lower detector means in a specific shielding orientation for both shielding said upper and lower radiation detector means against background gamma radiation, and for increasing the sensitivity of each of said detector means to gamma radiation emitted by garments on the conveyor assembly by providing a gamma reflective wall over each of the detector means, and a height adjustable mounting means for mounting said upper radiation detector means and said upper shield means above said conveyor assembly and for adjusting the distance between the detector means and the garments moved by the conveyor assembly while maintaining the upper shield means in said same shielding orientation with respect to said upper detector means, and a support cabinet for supporting said conveyor assembly and radiation detector assembly that includes a plurality of height adjustable wheels both to render the apparatus movable and to provide a means of leveling the conveyor assembly.

22. The apparatus defined in claim 21, wherein said radiation detector assembly includes a protective screen means for each of the detector means having a sheet of a flexible plastic material which is thin enough to be substantially transparent to beta radiation, but thick enough to prevent lint and other foreign matter from entering the interior of the detector means.

23. The apparatus defined in claim 22, wherein said flexible plastic material is between 0.10 and 0.50 mils thick.

24. The apparatus defined in claim 22, wherein said flexible plastic material is formed of polyester.

25. The apparatus defined in claim 22, wherein said radiation detector assembly includes a control panel having a plurality of pressure-actuable switches, and a flexible dust cover disposed over the switches of said panel for preventing dust from accumulating in said switches and for transmitting the pressure applied by the finger of a system operator to said switches.

26. The apparatus defined in claim 22, wherein said detector means is a gas-flow proportional detector having a single conductive housing for forming one electrode of one charge, and a plurality of parallel electrode wires for forming multiple electrodes of an opposite charge.

* * * * *